United States Patent [19]
Ohori et al.

[11] Patent Number: 6,010,282
[45] Date of Patent: Jan. 4, 2000

[54] ONE-PIECE TOOL

[75] Inventors: Harry Ohori, Toms River, N.J.; Otto Schroeder, Canadaigua, N.Y.

[73] Assignee: Swisscomatic, Inc., Cedar Knolls, N.J.

[21] Appl. No.: 09/057,233

[22] Filed: Apr. 8, 1998

[51] Int. Cl.[7] .................................................. B23B 27/08
[52] U.S. Cl. ........................ 407/113; 407/116; 407/120; 82/131
[58] Field of Search ................................ 407/113, 14, 15, 407/17, 42, 116, 117, 120; 82/120, 121, 123, 130, 131

[56] References Cited

U.S. PATENT DOCUMENTS

| | | | |
|---|---|---|---|
| 1,514,842 | 11/1924 | Evans | 407/113 |
| 1,556,949 | 10/1925 | Mall | 82/137 X |
| 1,797,944 | 3/1931 | Dustan | 82/130 |
| 2,831,240 | 4/1958 | Maurer | 407/120 X |
| 2,858,552 | 11/1958 | Hercik | 82/130 X |
| 3,109,222 | 11/1963 | Wiseman | 407/120 |

FOREIGN PATENT DOCUMENTS

| | | | |
|---|---|---|---|
| 0057625 | 8/1982 | European Pat. Off. | 407/116 |
| 3612180 | 10/1987 | Germany | 407/120 |

*Primary Examiner*—Andrea L. Pitts
*Assistant Examiner*—Henry W. H. Tsai
*Attorney, Agent, or Firm*—McAulay Nissan Goldberg Kiel & Hand

[57] ABSTRACT

The tool is provided with a blade section having a shaped surface for shaping an end of an elongated workpiece. This shaped surface extends from the blade section into and through a body section. After the blade section has worn, the tool may be re-ground to provide a fresh blade surface within the original body portion without a need to regrind the shaped surface.

16 Claims, 1 Drawing Sheet

ONE-PIECE TOOL

This invention relates to a one-piece tool. More particularly, this invention relates to a one-piece tool for shaping an end of an elongated workpiece.

Heretofore, various tools have been known for shaping a workpiece. For example, tools have been known for shaping an end of an elongated workpiece to have a surface, such as a spherical surface, conical surface, bulbous surface and the like. Typically, the elongated workpiece, such as a continuous wire of metal material, is fed intermittently along a feed axis within a tool holder in which one or more tools are mounted perpendicularly of the feed axis of the workpiece. In addition, the tool holder is rotated about the feed axis of the workpiece so that the radially inwardly extending tools contact and shape the forward end of the workpiece into the desired shape. Once the shape has been obtained, the workpiece is indexed forwardly so that a fresh section of the workpiece is brought into the shaping plane of the tool. Thus, at the same time the tool shapes the forward of a workpiece, the tool also cuts off the trailing end of a previously shaped section of the workpiece.

As is known, the shaping tools are generally constructed with a blade section having a shaping surface at one end and a trailing body section which serves for the mounting of the blade section. Generally, the blade section carries out the shaping and cutting functions while the body section serves as a backup to hold the blade section in place. However, over time, the blade section wears so that the entire tool must be replaced.

Accordingly, it is an object of the invention to provide a tool for shaping purposes which has an extended life.

It is another object of the invention to provide a tool for shaping purposes which can be re-shaped in an economical manner.

It is another object of the invention to provide a one-piece shaping tool which can be reground in order to provide for an extended life of the tool.

Briefly, the invention provides a one-piece tool which includes a blade section for shaping an end of an elongated workpiece and a body section extending from the blade section along a longitudinal axis of the tool.

The blade section is formed with a shaped surface extending longitudinally of the longitudinal axis for shaping an end of an elongated workpiece disposed perpendicularly of the tool during relative rotation between the blade section and the workpiece as well as a flat section adjacent the shaped surface which extends longitudinally of the longitudinal axis.

In accordance with the invention, the body section has a shaped surface extending coaxially from the shaped surface of blade section as well as a flat surface adjacent this shaped surface and extending from the flat surface of the blade section longitudinally of the axis of the tool.

The construction of the tool is such that after the blade section has worn to a degree that replacement is required, the tool is simply reground into the body section so that the shaped surface of the body section becomes a shaped surface of a fresh blade section of the tool. The relative length of the body section to the blade section may be such that the body section may be reground multiple times, such as four or five times, in order to provide a like number of fresh blade sections before the tool has been exhausted.

The tool is generally mounted in a suitable tool holder which is rotatable about a longitudinal feed axis of an elongated workpiece. In this regard, one or more tools are mounted radially inwardly of the tool holder. As each tool is reshaped and placed back into the tool holder, a spacer block may be mounted behind the tool within the tool holder to accommodate any backup space behind the tool.

These and other objects and advantages of the invention will become more apparent from the following detailed description taken in conjunction with the accompanying drawings wherein.

Figure 1:
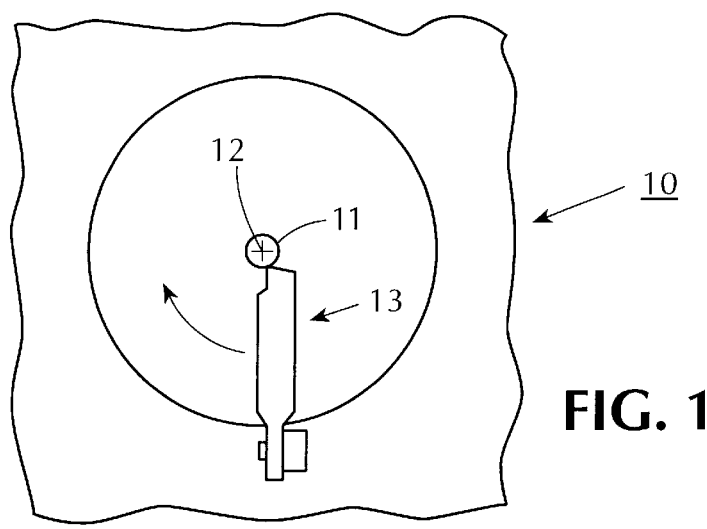
FIG. 1 illustrates a part cross-sectional view of a tool holder mounting a tool in accordance with the invention for shaping the end of an elongated workpiece.

Referring to FIG. 1, a tool holder 10 of conventional construction is mounted for rotation about an elongated workpiece 11 disposed on a longitudinal feed axis 12. Typically, the tool holder 10 rotates at a speed of from 3000 rpm to 10,000 rpm. In addition, at least one tool 13 is mounted in the tool holder perpendicularly of the feed axis 12. The tool holder 10 may be provided with two or more tools 13 (not shown) which would then be mounted on opposite sides of the feed axis 12 for the shaping of the end of the workpiece 11 in generally known manner.

Figure 2:
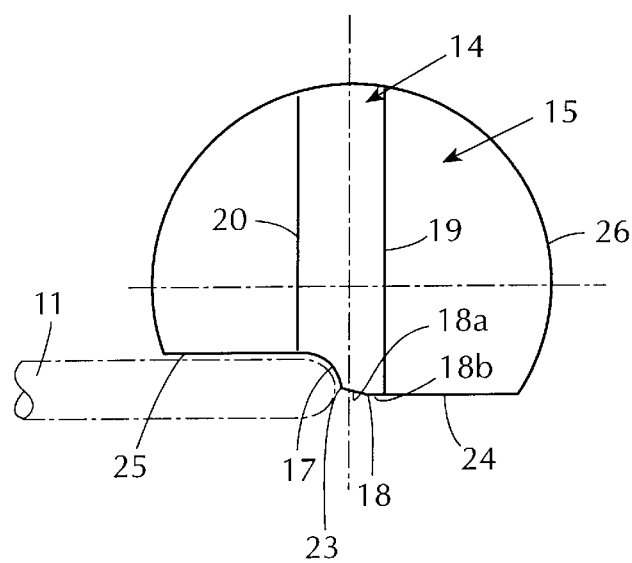
FIG. 2 illustrates an end view of a tool constructed in accordance with the invention.
Figure 3:
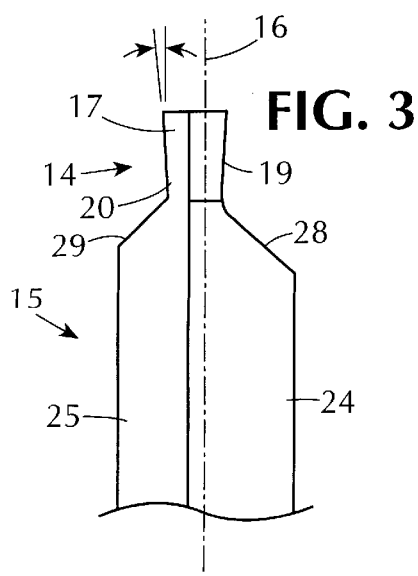
FIG. 3 illustrates a cross-sectional longitudinal view of one section of a tool constructed in accordance with the invention.
Figure 4:
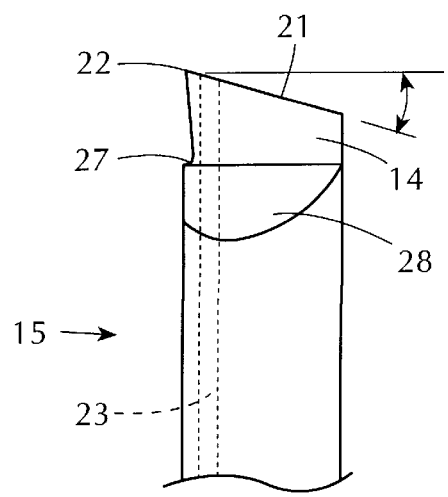
FIG. 4 illustrates a side view of a portion of a tool constructed in accordance with the invention.

Referring to FIGS. 2, 3 and 4, the tool 13 has a blade section 14 at one end and a body section 15 enlarged relative to the blade section 14 and extending from the blade section 14 along a longitudinal axis 16 of the tool 13 (see FIG. 3).

Referring to FIGS. 2 and 3, the blade section 14 has a shaped surface 17 extending longitudinally of the axis 16 for shaping an end of the elongated workpiece 11 (see FIG. 1) contacted thereby during rotation between the blade section 14 and the workpiece 11. In this embodiment, the shaped surface 17 is disposed on a radius which defines a quadrant of a circle. During a shaping operation, the shaped surface 17 shapes the end of the workpiece 11 to correspond to the shape of the surface 17. As indicated schematically in FIG. 2, the radius of the shaped surface 17 is equal to the radius of the workpiece 11, for example 3/32 inch. Thus, the end of the workpiece 11 is shaped into a semi-circular cross-sectional shape, i.e. a hemispherical shape.

In the alternative, the shaped surface may be of any curvilinear shape, such as ellipsoid, parabolic and the like, flat, or of a complex shape such as three consecutive differently curved or flap shapes.

Referring to FIGS. 2 and 3, the blade section 14 also has a flat surface 18 extending away from the shaped surface 17, or a sequence of flat surfaces 18a, 18b, as shown in FIG. 2 as well as a pair of flat walls 19, 20 disposed on opposite sides of the longitudinal axis 16 (see FIG. 3). As indicated in FIG. 2, the shaped surface 17 extends between the walls 19, 20. In addition, one wall 19 extends from the flat surface 18 while the opposite wall 20 extends from the shaped surface 17 to face away from the wall 19. By way of example, the thickness of the blade section from wall 19 to wall 20 is about 3/16 inch while the length of the blade section is about 1/4 inch.

Referring to FIG. 4, the end of the blade section 14 is formed by a flat wall 21 which is angularly disposed to the axis 16. This wall 21 defines a sharp tip 22 with the wall 18 adjacent to the shaped surface 17.

Referring to FIGS. 3 and 4, the body section 15 includes a shaped surface 23 which extends coaxially from the shaped surface 17 of the blade section 14 throughout the length of the body section 15 and is of the same shape. In the present example, the shaped surface 23 of the body section 15 is disposed on a radius equal to the radius of the shaped section 17 of the blade section 14.

Referring to FIG. 2, the body section 15 also has a first flat surface 24 adjacent the shaped surface 23 which extends longitudinally of the axis 16 of the tool. In addition, the body section 15 has a second flat surface 25 adjacent the shaped surface 23 on a side opposite the flat surface 24 which extends longitudinally of the tool axis 16. Still further, the body section 15 has a part-cylindrical surface 26 extending peripherally between the two flat surfaces 24, 25. This part-cylindrical surface 26 extends into the back side of the blade portion 14.

The first flat surface 24 of the body section extends from the flat surface 18 of the blade section 14 but is angularly disposed relative thereto and forms a small notch 27 as indicated in FIG. 4.

Referring to FIG. 4, the body portion 15 has a flat chamfer surface 28 between the part-spherical surface 26 thereof and the wall 19 of the blade section 14 as well as a flat chamfer surface 29 (see FIG. 3) between the part-spherical surface 26 and the second wall 20 of the blade section 14.

The tool 13 may be provided with any suitable type of shaped end opposite the blade section end for mounting purposes.

The blade section 14 is of generally conventional structure and is used in a conventional fashion to shape the end of a workpiece 11. When the blade section 14 has worn to a point as to be no longer usable, the tool 13 is removed from the tool holder 10 and re-ground. To this end, the worn blade section 14 is removed and a fresh blade section is formed in the body 15 of the tool 13. In this respect, no special tooling is required in order to form the shaped surface 17 as the shaped surface 23 in the body section 13 already has the desired shape and the remaining surfaces to be ground are all flat surfaces. This is of particular advantage where the shaped surface has a composite shape.

The tool 13 is thus capable of providing a multiplicity of blade sections 14. For example, four or five blade sections may be formed from a single tool.

Each time a fresh blade section is re-ground in the tool 13 and the tool 13 replaced in the tool holder 10, a suitable backup plate (not shown) may be provided to accommodate the decreased length of the tool. A suitable mounting may be provided to hold the re-ground tool 13 in the tool holder 10.

What is claimed is:

1. A one-piece tool for shaping an end of an elongated workpiece, said tool comprising
    a blade section having a longitudinal axis and a shaped surface extending longitudinally of said axis for shaping an end of an elongated workpiece contacted thereby during relative rotation between said blade section and the workpiece and a flat surface adjacent said shaped surface and extending longitudinally of said axis; and
    an enlarged body section extending from said blade section longitudinally of said axis, said body section having a shaped surface extending coaxially from said shaped surface of said blade section throughout the length of said body section, a first flat surface adjacent said shaped surface of said body section and extending from said flat surface of said blade section longitudinally of said axis, and a part-cylindrical surface extending along and peripherally the length of said body section.

2. A one-piece tool as set forth in claim 1 wherein said body section has a second flat surface adjacent said shaped surface of said body section and extending longitudinally of said axis, said part-cylindrical surface extending peripherally between said first flat surface and said second flat surface of said body section longitudinally of said axis.

3. A one-piece tool as set forth in claim 2 wherein said first flat surface of said body section is angularly disposed relative to said flat surface of said blade section.

4. A one-piece tool as set forth in claim 2 wherein said shaped surface of said blade section is disposed on a radius and said shaped surface of said body section is disposed on an equal radius.

5. A one-piece tool as set forth in claim 4 wherein said shaped surface of said blade section defines a quadrant of a circle.

6. A one-piece tool as set forth in claim 2 wherein said blade section has a first flat wall on one side longitudinally of said axis, a second flat wall on an opposite side from said first wall and longitudinally of said axis, said second wall extending from said shaped surface of said blade section.

7. A one-piece tool as set forth in claim 6 wherein said body section has a first flat chamfer surface between said part-cylindrical surface thereof and said first wall of said blade section and a second flat chamfer surface between said part-cylindrical surface thereof and said second wall of said blade section.

8. A one-piece tool as set forth in claim 1 wherein said shaped surface of said blade section is disposed on a radius and said shaped surface of said body section is disposed on an equal radius.

9. A one-piece tool as set forth in claim 8 wherein said shaped surface of said blade section defines a quadrant of a circle.

10. A one-piece tool for shaping an end of an elongated workpiece, said tool comprising
    a blade section having a longitudinal axis and a peripheral surface about said axis, said peripheral surface including a pair of flat walls, each wall being disposed on an opposite side of said axis from the other flat wall to face away from said other flat wall, and a shaped surface between said flat walls and extending longitudinally of said axis for shaping an end of the elongated workpiece; and
    a body section of enlarged cross-section relative to said blade section extending from said blade section longitudinally of said axis, said body section having a peripheral surface disposed about said axis, said peripheral surface including a shaped surface extending longitudinally throughout the length of said body section and coaxially from said shaped surface of said blade section and a first flat surface adjacent said shaped surface and extending longitudinally of said axis.

11. A one-piece tool as set forth in claim 10 wherein said body section has a second flat surface adjacent said shaped section of said body section and extending longitudinally of said axis and a part-cylindrical surface extending between said first flat surface and said second flat surface of said body section longitudinally of said axis.

12. A one-piece tool as set forth in claim 10 wherein said shaped surface of said blade section is disposed on a radius and said shaped surface of said body section is disposed on an equal radius.

13. A one-piece tool as set forth in claim 12 wherein said shaped surface of said blade section defines a quadrant of a circle.

14. In combination,
    a tool holder mounted for rotation about an elongated workpiece disposed on a longitudinal feed axis; and at least one tool mounted in said tool holder perpendicularly of said faced axis, said tool having a blade section disposed on a longitudinal blade axis perpendicularly of said feed axis and including a shaped surface extending longitudinally of said blade axis for shaping an end of the workpiece on said feed axis during rotation of said tool holder about said feed axis and a flat surface adjacent said shaped surfaced thereof, said tool having a body section extending coaxially from said blade section and including a shaped surface extending coaxially from said shaped surface of said blade section, a first flat surface adjacent said shaped surface of said body section and extending from said flat surface of said blade section, a second flat surface adjacent said shaped surface of said body section and extending longitudinally of said axis and a part-cylindrical surface extending between said first flat surface and said second flat surface of said body section longitudinally of said axis.

15. In combination, a tool holder mounted for rotation about an elongated workpiece disposed on a longitudinal feed axis; and at least one tool mounted in said tool holder perpendicularly of said feed axis, said tool having a blade section disposed on a longitudinal blade axis perpendicularly of said feed axis and including a shaped surface disposed on a radius and extending longitudinally of said blade axis for shaping an end of the workpiece on said feed axis during rotation of said tool holder about said feed axis, said tool having a body section extending coaxially from said blade section and including a shaped surface disposed on an equal radius to said shaped surface of said blade section and extending coaxially from said shaped surface of said blade section.

16. The combination as set forth in claim 15 wherein said shaped surface of said blade section defines a quadrant of a circle.

* * * * *

UNITED STATES PATENT AND TRADEMARK OFFICE
CERTIFICATE OF CORRECTION

PATENT NO. : 6,010,282
DATED : January 4, 2000
INVENTOR(S) : Harry Ohori

It is certified that error appears in the above-identified patent and that said Letters Patent is hereby corrected as shown below:

Column 5, line 2 change "faced" to -feed-

Signed and Sealed this

Eighth Day of August, 2000

Attest:

Q. TODD DICKINSON

*Attesting Officer*    *Director of Patents and Trademarks*